April 1, 1952     W. J. METZGER     2,591,275
CAR COUPLER

Filed June 8, 1949     5 Sheets-Sheet 1

INVENTOR.
WILLIAM J. METZGER
BY
ATTORNEY

April 1, 1952  W. J. METZGER  2,591,275
CAR COUPLER

Filed June 8, 1949  5 Sheets-Sheet 2

INVENTOR.
WILLIAM J. METZGER
BY
*Albert E. Fickel*
ATTORNEY.

April 1, 1952 W. J. METZGER 2,591,275
CAR COUPLER
Filed June 8, 1949 5 Sheets-Sheet 3
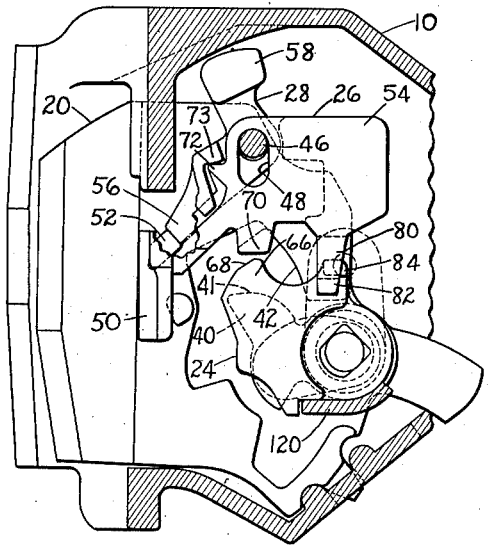
Fig. 6
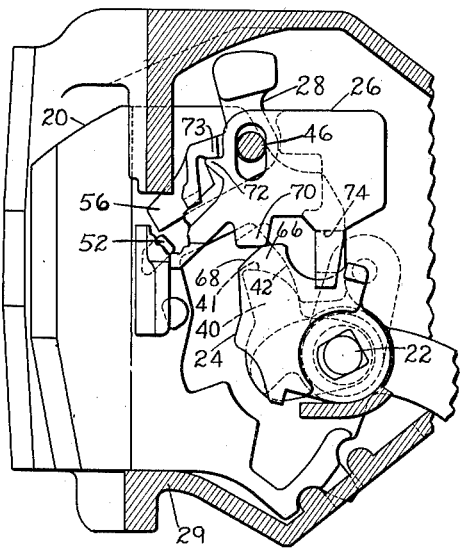
Fig. 7
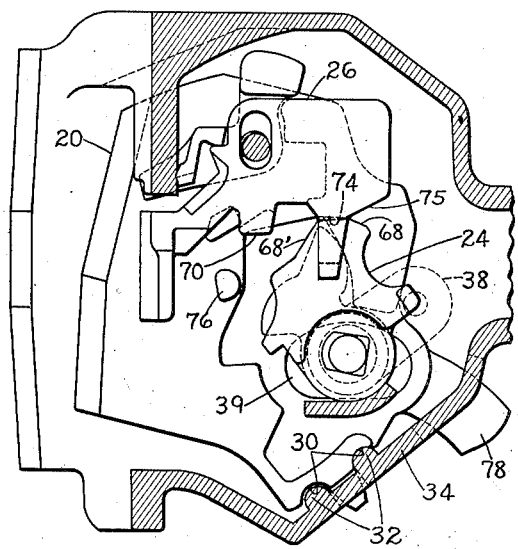
Fig. 8
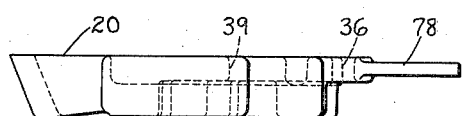
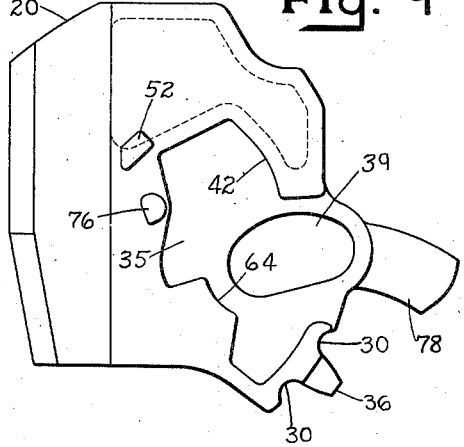
Fig. 9
INVENTOR.
WILLIAM J. METZGER
BY
Albert E. Field
ATTORNEY April 1, 1952 W. J. METZGER 2,591,275
CAR COUPLER
Filed June 8, 1949 5 Sheets-Sheet 4
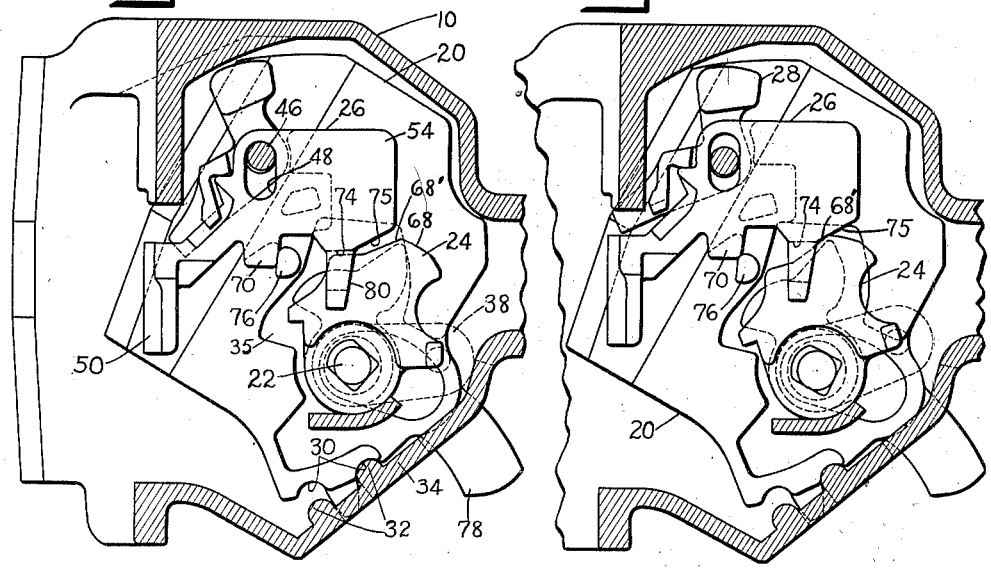
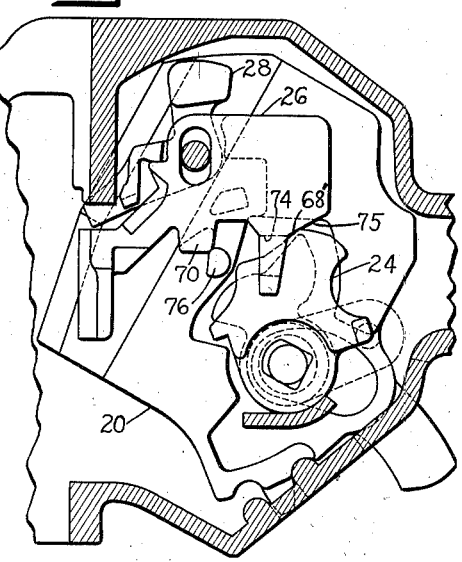
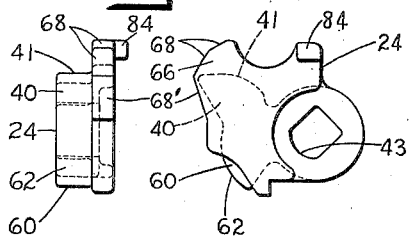
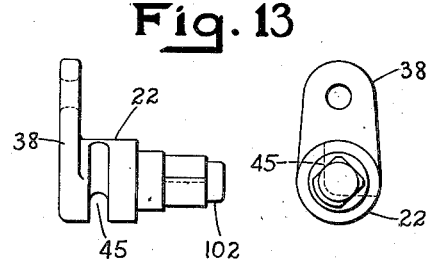
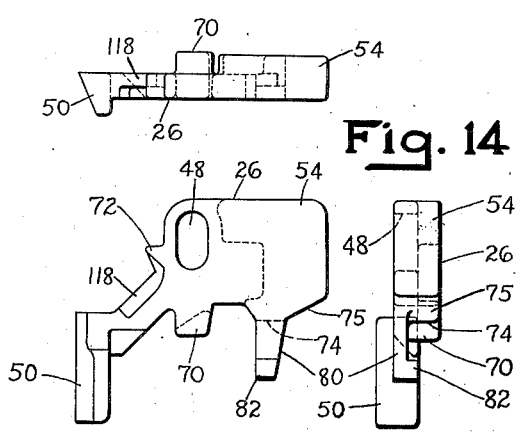
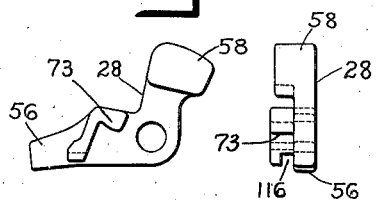
INVENTOR.
WILLIAM J. METZGER
BY
ATTORNEY INVENTOR.
WILLIAM J. METZGER
BY Albert C. Field
ATTORNEY Patented Apr. 1, 1952

2,591,275

UNITED STATES PATENT OFFICE 2,591,275

CAR COUPLER

William J. Metzger, East Cleveland, Ohio, assignor to National Malleable and Steel Castings Company, Cleveland, Ohio, a corporation of Ohio Application June 8, 1949, Serial No. 97,748

28 Claims. (Cl. 213—100)

This invention relates to car couplers of the rigid-jawed type such as shown in U. S. Patent 1,201,665 of John Willison dated October 17, 1916.

The invention comprises the provision of novel coupler operating means to provide efficient and safe operation of couplers of the type disclosed in the above patent. More particularly the invention comprises the provision of new and improved means for movement of the lock from locked to lock-set position and in addition the provision of means for releasing the lock from lock-set position in the event it is inadvertently moved to such position. My invention also provides positive anti-creep means for the lock. It further provides preliminary stop means for the lock to assure coupling of the couplers at relatively high speeds. Various other features and advantages of the invention will be set forth in the accompanying description taken in conjunction with the drawings in which:

Fig. 6 is a side elevational view partly in section showing the coupler in position corresponding to coupled position and illustrating the anti-creep to the lock.

Fig. 7 is a view similar to Fig. 6 with the anti-creep to the lock just released.

Fig. 8 is a side elevational view partly in section showing the parts in an intermediate position of operation.

Fig. 9 shows top and side view details of the coupler lock.

Fig. 10 is a side elevational view partly in section showing the lock moved to lock-set position.

Fig. 11 is a view similar to Fig. 10 showing the lock being released from lock-set position.

Fig. 12 shows end and side view details of the lock thrower.

Fig. 13 shows side and end view details of the rotor lever.

Fig. 14 shows top, side and end view details of the lock-set member.

Fig. 15 shows side and end view details of the anti-creep element.

Figure 1:
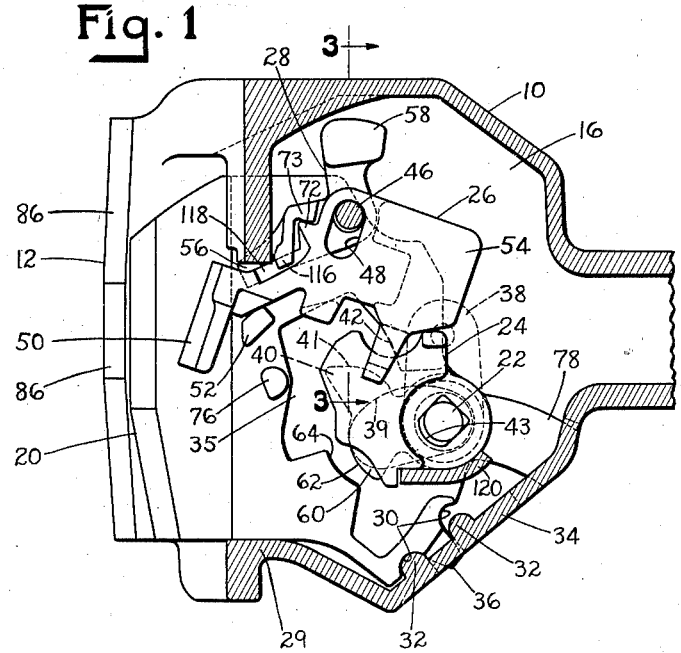
Fig. 1 is a side elevational view partly in section taken along line 1—1 of Fig. 4 of a coupler embodying my invention, the operating parts being shown in full and in position corresponding to uncoupled position of the coupler.

Referring to the drawings the coupler head 10 has the usual buffing jaw 12 and pulling jaw 14. Pulling jaw 14 is formed with a recess 14a for receiving the complementary buffing jaw 12 of the opposing coupler head. The coupler head has a cavity 16 in which are contained the lock 20, rotor lever 22, lock thrower 24, lock-set member 26 and the anti-creep element 28.

The lock 20 is supported on the bottom wall 29 of the coupler head when it is in forward or locking position as shown in Fig. 1 and has a pair of spaced sockets 30 at its lower rearward end which are adapted to engage spaced curved bearing portions 32 on the rearwardly upwardly sloping bottom wall 34 of the coupler head. With the coupler parts in reposed position the lower one of sockets 30 is in engagement with the lower one of bearing portions 32. During rearward movement of the lock the latter pivots or rolls about the lower of bearing portions 32 until the upper bearing portion 32 is engaged by its associated socket 30 and thereafter further rearward rolling of the lock takes place about the latter bearing. Between sockets 30 the lock is provided with a guide lug 36 in the shape of a gear tooth which is received in an opening between bearing portions 32 on wall 34. Top and side detail views of the lock are shown in Fig. 9.

The lock thrower 24 is mounted on the rotor lever 22 for rotation therewith during actuation of the coupler operating mechanism. The thrower is partly received in a recess 35 in the side of lock 20. The rotor lever is provided with an arm 38 to which any conventional or suitable type of uncoupling mechanism may be connected. The rotor lever extends through an elongated opening 39 in lock 20, which opening permits the lock to be moved rearwardly the required amount during the lock setting operation. Upon actuation of the uncoupling mechanism the rotor lever and lock thrower are rotated in a clockwise direction when the coupler is viewed as shown in Fig. 1. The lock thrower is provided with a lug 40 disposed within lock recess 35 and having a cam surface 41 for engagement with surface 42 on the lock, thereby causing the lock to roll about the lower one of bearings 32 and be moved rearwardly. Lock thrower 24 has a square-shaped opening except for a rounded portion 43 for receiving the correspondingly shaped portion of rotor lever 22. The rounded portion assures correct positioning of the rotor lever with respect to the lock thrower. A retaining bolt 44 secured to the coupler head cooperates with a groove 45 in the rotor lever to hold the latter in assembled position. Detail views of the lock thrower and rotor lever are shown in Figs. 12 and 13, respectively, Fig. 12 showing end and side views of the thrower, and Fig. 13 showing side and end views of the rotor lever.

The lock-set member 26 is mounted in the coupler on a trunnion 46 extending from inner wall 47 of the coupler head. Top, side and end detail views of the lock-set member are shown in Fig. 14. The lock-set member has an elongated slot 48 which receives trunnion 46 to permit pivotal as well as sliding movement of the member with respect to the coupler head. A forward projection 50 is provided on the lock-set member and is adapted to engage the lock and buffing jaw of a mating coupler, when the couplers have been coupled, to maintain the member in the position shown in Fig. 6. It will be understood that in Figs. 6, 7, 8, 10 and 11 the lock-set member 26 has been shown in the position it assumes when projection 50 thereof is engaged by the opposing coupler.

At the rearward end of the lock-set member is provided a counterweight portion 54 which, when the coupler is not coupled to another coupler, maintains the member with projection 50 extending forwardly as shown in Fig. 1. In this position the anti-creep element 28 is out of anti-creep relationship with the lock and the coupler is ready for coupling.

Figure 3:
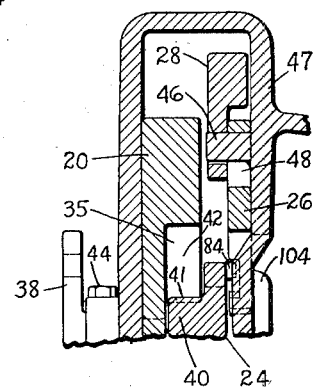
Fig. 3 is a partial sectional view taken along line 3—3 of Fig. 1.

The anti-creep element 28 as may be seen in Fig. 3 is positioned adjacent lock-set member 26 and is also mounted on trunnion 46 for pivotal movement thereabout. Element 28 has a forwardly extending arm 56 which is adapted to engage lug 52 on the lock to prevent undesired rearward movement of the lock when the coupler is coupled with a mating coupler, as shown in Fig. 6. In Fig. 6 the lock, though still in locked position, has been moved rearwardly a slight amount to illustrate the contact between lug 52 thereof and arm 56 of the anti-creep element. A counterweight 58 disposed so as to act in a counter clockwise direction is provided on the anti-creep element to assure that arm 56 will remain in position to be engaged by lug 52 under all conditions of end shock as well as vertical shock encountered in service, thereby precluding accidental unlocking of the coupler. In Fig. 15 are shown side and end detail views of the anti-creep element.

Preliminary stop means for limiting the rearward movement of the lock is provided to assure locking of the couplers during relatively high-speed coupling. This consists in the provision of a stop lug 60 on the lock thrower having a curved surface 62 adapted to engage a correspondingly curved surface 64 on the lock to limit rearward movement of the lock during coupling. Therefore when two couplers are in the process of coupling and the buffing and pulling jaws of the couplers have moved to interengaged position, the locks have a comparatively short distance to travel back to locked position, and coupling will be effected even when the couplers approach at relatively high speeds. Without the provision of the preliminary stop means the locks during the coupling operation might be moved rearwardly the full extent of their permissible rearward travel and might not drop back to locked position in time to lock the buffing and pulling jaws while they were still interengaged and therefore the couplers might separate and not be coupled.

The operation of the coupler mechanism to effect movement of the lock from locked position (Fig. 6) to lock-set position (Fig. 10) is as follows:

The anti-creep element 28 is moved out of its anti-creep position (Fig. 6) during the initial actuation of the rotor lever 22 by means of the uncoupling mechanism. A projection 66 on lock thrower 24 is provided with a cam surface 68 which during rotation of the thrower engages the underside of lug 70 on lock-set member 26, thereby raising the latter. This, in turn, causes lug 72 on the lock-set member, which is in engagement with stop lug 73 on the anti-creep element, to rotate the anti-creep element about trunnion 46, thus moving arm 56 out of anti-creep relationship with stop 52 on the lock, as seen in Fig. 7. After the anti-creep element has thus been moved to inactive position, lug 40 of the thrower engages surface 42 on the lock to effect rearward rolling of the lock about lower bearing 32. It is to be noted that throughout the remainder of the rotary movement of the thrower, lug 40 will act against surface 42 to retract the lock until lock-set position is reached. From the position of the parts shown in Fig. 7 as rotation of the thrower is continued, simultaneously with the retraction of the lock the lock-set member is elevated through the action of cam surface 68 on the thrower against surface 74 on the lock-set member, as shown in Fig. 8. Also during a predetermined amount of movement of the lock during this operation the engagement between the lower one of sockets 30 and its corresponding bearing portion 32 on wall 34 of the coupler head is transferred to the other socket 30 and bearing portion 32. The remainder of the rearward movement of the lock takes place about this second bearing 32.

As rotation of the lock thrower continues from the position in Fig. 8, further rearward rolling of the lock brings lug 76 on the lock into engagement with the underside of lug 70 on the lock-set member. Thereafter, as the lock is rolled rearwardly lug 76 supports the lock-set member and cam surface 68 on thrower 24 is moved rearwardly belond surface 74. Also during this movement cam surface 68', which is a continuation of cam surface 68, is moved rearwardly so as to be clear of both surface 74 and sloping surface 75 on the lock-set member. Therefore, as soon as lug 76 has moved rearwardly past lug 70 the lock-set member is free to drop to the position shown in Fig. 10, wherein lug 70 is in front of lug 76. The lock is now in lock-set position and is precluded from moving forwardly by lug 70. It will be observed that the lock-set member is supported in this position on trunnion 46 at the upper end of slot 48. It will be understood that the lock-set member is held against forward movement by the engagement of projection 50 with the lock and buffing jaw of the opposing coupler. With the lock in lock-set position the couplers may be separated and therefore as the opposing lock and buffing jaw move away from projection 50, the counterweight portion 54 of the lock-set member swings the member to the position shown in Fig. 1, allowing the lock to drop back to locked position. This movement of the lock-set member is assisted by the downward force exerted by the lock through lug 76 thereof against lug 70 on the lock-set member.

In the event it is desired to release the lock from lock-set position while the couplers are still coupled the rotor lever may be rotated in the opposite direction so that cam surface 68' on lock thrower 24 will engage sloping surface 75 of the lock-set member and raise the member sufficiently so that lug 70 will be clear of lug 76 on the lock, as shown in Fig. 11, and allow the lock to return to its normal locked position. It will be seen therefore that my invention provides a simple and safe means for releasing the lock from lock-set position in the event the lock is inadvertently placed in such position.

It is to be noted that sockets 30 on the lock and bearing portions 32 on the coupler head provide smooth movement of the lock from locked position rearwardly to lock-set position. Guide lug 36 on the lock assures that proper engagement of bearing portions 32 in their respective sockets 30 will be maintained at all times. It will also be observed that with the lock in lock-set position (Fig. 10) a preponderance of the mass of the lock is forward of the engagement between socket 30 and bearing portion 32 so that the lock will be effectively returned by gravity to locked position.

The coupler lock is provided with a signal lug 78 at its rearward end adapted to extend through an opening in bottom wall 34 of the coupler. When the lock is in locked position, signal lug 78 does not protrude through the opening in wall 34. However, whenever the lock is moved rearwardly this lug extends through the opening and thereby is an indication that the lock is not in locked position.

In service while the cars are in motion in order to assure that the lock-set member will not be accidently moved upwardly through the relative vertical movement which takes place between the couplers, the lock-set member as shown best in Fig. 6 is provided with a leg 80 which has a lug 82 normally underlying a lug 84 on the lock thrower. Therefore any tendency of the lock or buffing jaw of the mating coupler, which are in engagement with projection 50 on the lock-set member, to urge the lock-set member upwardly will be prevented through the engagement of lugs 82 and 84. This will ensure that while the couplers are coupled the anti-creep element 28 will not be moved out of its anti-creep relationship with lug 52 on the lock by the lock-set member. The lock will therefore remain in locked position. Lugs 82 and 84 in no way interfere with the operation of the coupler during normal coupling or uncoupling of the couplers.

Figure 2:
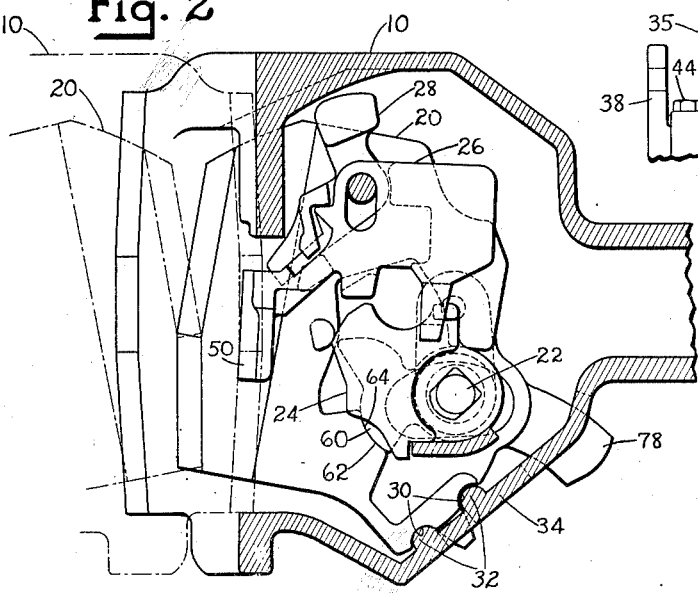
Fig. 2 is a side elevational view partly in section showing the coupler in the process of being coupled with a mating coupler, the lock of each coupler being in preliminary stop position.
Figure 4:
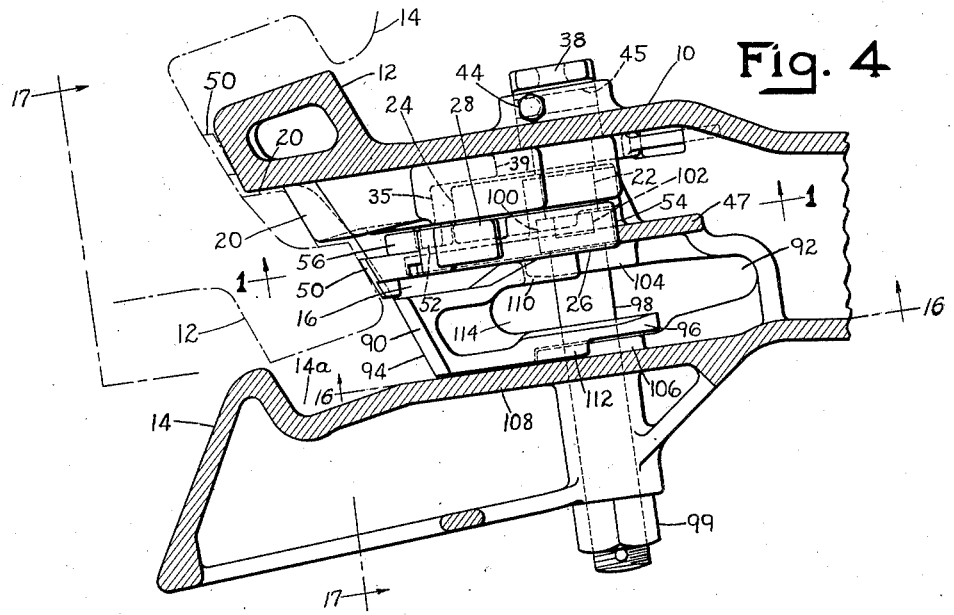
Fig. 4 is a transverse sectional view, the couplers and their operative parts being in the same position as shown in Fig. 2.
Figure 5:
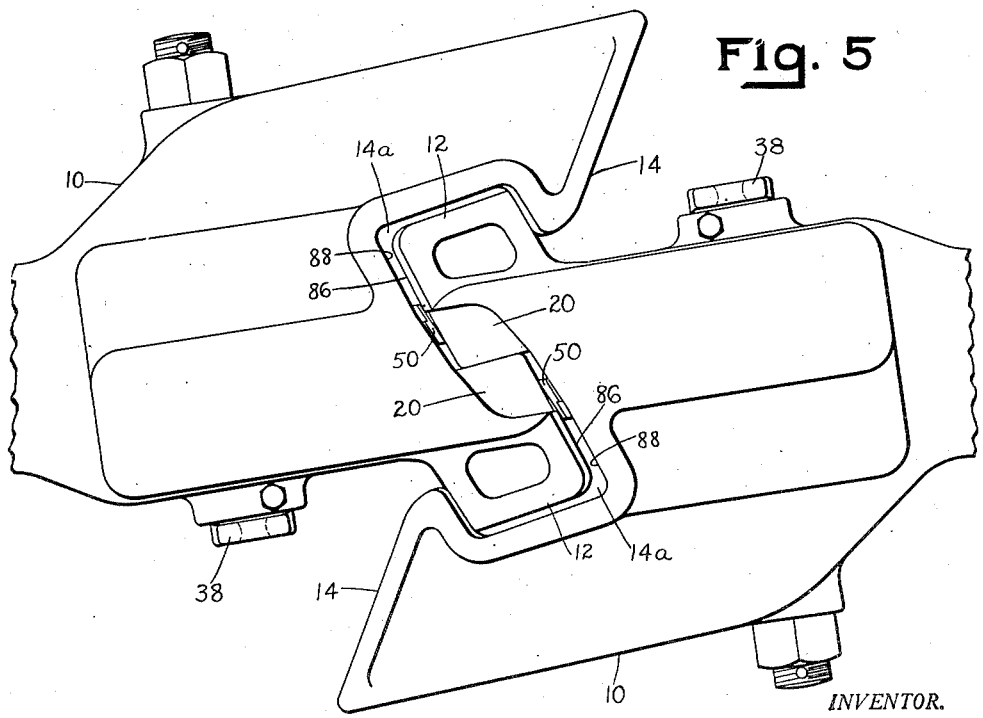
Fig. 5 is a plan view showing two couplers coupled and being in pulled relationship.

Prior to the coupling of two couplers the operative parts of each are disposed as shown in Fig. 1. As the couplers approach for coupling the locks 20 thereof will come into contact before buffing jaws 12 engage projections 50 on the lock-set member. This initial contact moves each lock rearwardly such an amount that lug 52 thereof will be disposed sufficiently rearward of the lower end of arm 56 of anti-creep element 28 so as to preclude the arm from moving into anti-creep relation with respect to lug 52 upon the subsequent counter-clockwise pivotal movement of lock-set member 26 in response to the contact between the buffing jaw and projection 50. As the couplers continue moving together each lock moves rearwardly to preliminary stop position, which position is shown in Figs. 2 and 4. Thereafter the couplers slide laterally relative to each other until the buffing and pulling jaws are interengaged, after which each lock returns to locked position, wherein the locks are in overlapping relationship, thus completing the coupling operation as shown in Fig. 5. It is to be noted that after the lock has returned to locked position anti-creep element 28 automatically swings into anti-creep relationship with respect to the lock, as seen in Fig. 6.

In Fig. 5 the couplers are shown coupled and subjected to pulling forces whereby the buffing jaws 12 are in engagement with pulling jaws 14. When the couplers are buffed, the buffing face 86 of each buffing jaw engages the front buffing face 88 of the coupler head. When these buffing faces are in engagement, none of the buffing forces are transmitted to the lock-set member even though projection 50 thereof is engaged by the opposing lock, since the lock-set member can be moved still further rearwardly in the corresponding coupler head.

Figure 16:
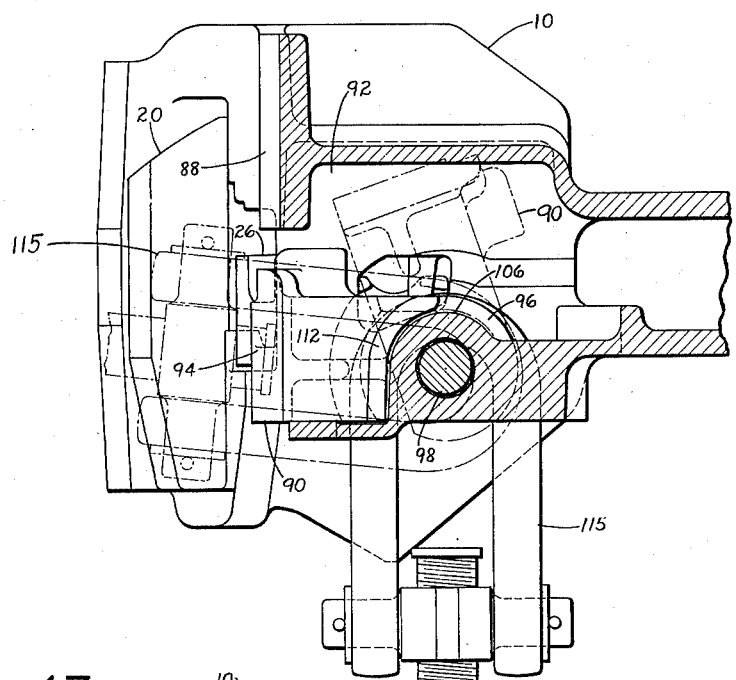
Fig. 16 is a vertical sectional view taken generally along line 16—16 of Fig. 4, showing a screw-type coupling connected to the coupler.
Figure 17:
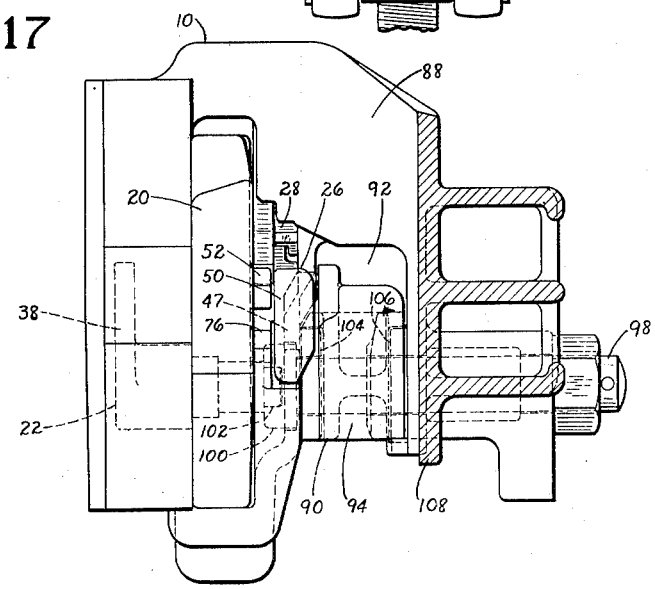
Fig. 17 is a front elevational view partly in section taken along line 17—17 of Fig. 4.

In order to adapt the coupler for use during the transition period in which the coupler is generally connected to a screw-type coupling a pivotally mounted buffing block 90 is provided in a cavity 92 in the coupler head. Buffing block 90 comprises a front buffing surface 94 which is normally in alignment with front buffing face 88 of the coupler and has a rearward extension 96 for connecting the block to a bolt 98 mounted on the coupler head. Bolt 98 is in axial alignment with rotor lever 22 and has a head 100 received in a recess in wall 47. Bolt head 100 is recessed to receive the cylindrical end portion 102 of the rotor lever. Bosses 104 and 106 are provided on walls 47 and 108 respectively. These bosses are adapted to be engaged in buff by portions 110 and 112, respectively, on the buffing block, which have contact surfaces shaped to correspond with the contact surfaces of the bosses. Extension 96 and portion 110 are spaced apart as at 114 to permit the screw-type coupling 115 as seen in Fig. 16, or other similar device to be connected to bolt 98. When the screw coupling is not in use the buffing block occupies the position shown in Figs. 4, 16 and 17. However, the block is adapted to be swung upwards and rearwardly whenever the screw coupling is to be used. The position of buffing block 90 and screw coupling 115 when the latter is in use is shown in dot-dash in Fig. 16.

The coupler may be readily adapted for post transition operation during which period buffing block 90 and bolt 98 are not required. In the post transition coupler front buffing face 88 is extended downwards to the bottom of the coupler and a boss is provided integral with wall 47 to replace the bolt head 100 for receiving the cylindrical end portion 102 of the rotor lever. Other structural changes may be made in the head of the post transition coupler for the purpose of increasing its strength.

A feature of the coupler construction resides in the use of the same operating parts in the transition and post transition forms of the coupler, thus greatly simplifying the use of this type of coupler which in previous transition and post transition designs required entirely different arrangements of parts for each.

The coupler may be assembled in the following manner: The buffing block 90 and the transition coupling, if desired, are first placed in the coupler head and then bolt 98 is inserted through the opening in the coupler head normally occupied by the rotor lever 22 and is moved laterally through the coupler, passing through the opening in extension 96 of the buffing block. With bolt 98 in place as shown in Fig. 4 nut 99 is applied to secure it in position. Next lock-set member 26 is placed on trunnion 46, the member lying adjacent wall 47. Anti-creep element 28 is next applied and it is also placed on trunnion 46 the end of which extends through opening 48 in the lock-set member. It will be observed that element 28 is provided with a grooved portion 116 which receives portion 118 of the lock-set member. This serves to retain the anti-creep element in place during the assembling of the coupler. Thereafter the lock thrower 24 is placed on shelf 120 in the position shown in Fig. 1. Then the lock 20 is applied through the front opening in the coupler head and placed in the position shown in Fig. 1. The assembly of the coupler is completed by the insertion of rotor lever 22 and the retaining bolt 44.

The coupler is disassembled by reversing the above steps of assembly.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. In a car coupler having a rigid jawed head, a lock adapted to reciprocate in a cavity in said head, a lock thrower pivotally mounted in said head and being adapted upon rotation in a given direction to move said lock rearwardly to lock-set position, a member operatively connected to said head and being adapted to maintain said lock in lock-set position, and means on said thrower for moving said member, upon rotation of said thrower in the opposite direction, so as to release said lock from lock-set position.

2. In a car coupler having a rigid jawed head, a lock adapted to reciprocate in a cavity in said head, and lock-setting means comprising a lock thrower rotatable in a given direction to move said lock rearwardly from locked to lock-set position, and a member adapted to be actuated by said thrower during rotation thereof to place said member in position to maintain said lock in lock-set position, said thrower upon rotation thereof in the opposite direction being adapted to move said member out of said position in which said lock is maintained in lock-set position to permit said lock to return to locked position.

3. In a car coupler, a head, a lock mounted in said head and adapted to assume a projected locking position and a retracted lock-set position, and operating means comprising a rotor lever, a lock thrower rotatable with said lever, and a lock-set member, said thrower upon rotation thereof in a given direction being adapted to move said member into position to maintain said lock in lock-set position, said thrower upon rotation thereof in the opposite direction, when said lock is in lock-set position, being adapted to release said member from said position in which said lock is maintained in lock-set position.

4. In a car coupler, a head, a lock mounted in said head and adapted to assume a projected locking position and a retracted lock-set position, and operating means comprising a lock thrower for moving said lock to lock-set position, and a lock-set member for maintaining said lock in lock-set position, said thrower being adapted to engage said member to move said member out of said position in which said lock is held in lock-set position.

5. In a car coupler, a rigid jawed head, a lock adapted to reciprocate in a cavity in said head, a lock thrower pivotally mounted in said head, and a member operable by said thrower upon rotation of said thrower in a given direction to move to a position in which said lock is held in lock-set position, said member being operable by said thrower to move out of position in which said lock is held in lock-set position upon rotation of said thrower in the opposite direction.

6. In a car coupler having a rigid jawed head, a lock adapted to reciprocate in a cavity in said head from locked to lock-set position, a member operatively connected to said head and being adapted to maintain said lock in lock-set position, and an anti-creep element mounted in said head and being adapted to prevent accidental movement of said lock out of locked position when said coupler is coupled to another coupler.

7. In a car coupler having a rigid jawed head, a lock adapted to reciprocate in a cavity in said head from locked to lock-set position, a member operatively connected to said head and being adapted to maintain said lock in lock-set position, and an anti-creep element for said lock adapted to prevent accidental movement of said lock out of locked position when said coupler is coupled to another coupler, and means on said member for moving said element out of anti-creep relationship with said lock during intentional unlocking of said coupler.

8. In a car coupler, a rigid jawed head, a lock adapted to reciprocate in a cavity in said head, a lock thrower pivotally mounted in said head and being adapted to retract said lock, a member operatively connected to said head and being adapted to maintain said lock in lock-set position, and an anti-creep element for said lock pivotally connected to said head, said lock thrower upon initial rotation thereof being adapted to raise said member, said member upon upward movement thereof being adapted to swing said element out of anti-creep relationship with said lock.

9. In a car coupler, a rigid jawed head, a lock adapted to reciprocate in a cavity in said head, a lock thrower pivotally mounted in said head and being adapted to retract said lock, a member operatively connected to said head and being adapted to maintain said lock in lock-set position, and an anti-creep element pivotally connected to said head and having an arm adapted to engage a portion of said lock to preclude unintentional rearward movement of said lock when said coupler is coupled to another coupler, said member being adapted to rotate said element to a position in which said arm is out of anti-creep relationship with said lock, said member being actuated by said thrower.

10. In a car coupler, a head, a lock mounted in said head and adapted to assume a projected locking position and a retracted lock-set position, an anti-creep element for maintaining said lock in locking position, a member for maintaining said lock in lock-set position, and a lock thrower for actuating said lock and said member, said member upon actuation thereof during initial movement of said thrower being adapted to move said element out of active position to permit movement of said lock to lock-set position.

11. In a car coupler, a rigid jawed head, a lock adapted to reciprocate in a cavity in said head, a lock thrower pivotally mounted in said head, and anti-creep means for said lock, said means comprising an element pivotally connected to said head and being adapted to engage a portion of said lock to preclude rearward movement thereof toward unlocked position when said coupler is coupled to another coupler, and a member for moving said element out of said position in which said lock is precluded from moving toward unlocked position, said member being operable by said lock thrower.

12. In a car coupler, a rigid jawed head, a lock adapted to reciprocate in a cavity in said head, a lock thrower pivotally mounted in said head, and anti-creep means for said lock, said means comprising an element pivotally connected to said head and having a portion adapted to be engaged by said lock to preclude rearward movement thereof toward unlocked position when said coupler is coupled to another coupler, and a member operatively connected to said head about the same axis as said element, said member being operable by said thrower, said member being adapted upon actuation thereof by said thrower to rotate said element out of said position in which said lock is precluded from moving toward unlocked position.

13. In a car coupler, a rigid jawed head, a lock adapted to reciprocate in a cavity in said head, said head having a trunnion therein, an anti-creep element pivotally connected to said trunnion and having an end portion adapted to be engaged by said lock to preclude rearward movement of the lock toward unlocked position, another member for cooperating with said element, said member being operatively connected to said trunnion, and a lock thrower pivotally connected to said head and being adapted to actuate said member, said member upon initial actuation thereof by said thrower being adapted to rotate said element about said trunnion to a position in which said end portion is out of anti-creep relationship with said lock.

14. In a car coupler having a rigid jawed head, a lock adapted to reciprocate in a cavity in said head, and a lock thrower for actuating said lock, said head comprising a bottom wall for supporting said lock in locked position, said wall having a rearwardly upwardly sloping portion provided with a pair of spaced upper and lower bearings about which said lock is adapted to be rolled rearwardly out of locked position, said lock having a pair of sockets for receiving said bearings, the lower one of said bearings being engaged with the corresponding one of said sockets during locked position of said lock, said engagement transferring to the upper one of said bearings and its corresponding socket after a predetermined amount of rearward rolling of said lock.

15. In a car coupler having a rigid jawed head, a lock adapted to reciprocate in a cavity in said head, and a lock thrower for actuating said lock, said head comprising lower and upper bearings about which said lock is adapted to be rolled rearwardly out of locked position, said lock having sockets for receiving said bearings, the lower one of said bearings engaging the corresponding one of said sockets when said lock is in locked position, said engagement transferring to the upper one of said bearings and the other of said sockets after a predetermined amount of rearward rolling of said lock.

16. In a car coupler, a rigid jawed head, a lock adapted to reciprocate in a cavity in said head, a lock thrower pivotally mounted in said head and adapted to retract said lock, a member operatively mounted on said head and having a forward projection for engagement with a portion of an opposing coupler, an anti-creep element for said lock adapted to be actuated upon upward movement of said member, and stop means on said member adapted to engage a portion of said thrower to preclude upward creeping of said member.

17. In a car coupler, a rigid jawed head, a lock adapted to reciprocate in a cavity in said head, a lock thrower pivotally mounted in said head and adapted to retract said lock, a member operatively mounted in said head and having a forward projection for engagement with a portion of an opposing coupler, an anti-creep element for said lock pivoted to said head, said member being adapted upon upward movement thereof to rotate said element out of anti-creep relationship with said lock during retraction of said lock by means of said lock thrower, and means on said member adapted to engage a portion of said thrower to preclude upward creeping of said member.

18. In a car coupler, a rigid jawed head, a lock adapted to reciprocate in a cavity in said head, a lock thrower, a member operatively mounted in said head and being adapted to maintain said lock in lock-set position, said member having forwardly extending means for engagement with a portion of an opposing coupler, an anti-creep element for said lock adapted to be actuated upon upward movement of said member, said member having stop means adapted to underlie a portion of said thrower to preclude upward creeping of said member.

19. In a car coupler, a rigid jawed head, a lock adapted to reciprocate in a cavity in said head, a lock thrower, an anti-creep element for said lock pivotally mounted in said head, and a member operatively mounted in said head and being adapted to maintain said lock in retracted position during uncoupling operations, said member extending forwardly in said head for operation by a portion of an opposing coupler, said member being adapted to swing said element out of anti-creep relationship with said lock upon upward movement of said member, and stop means on said member adapted to engage said thrower to preclude upward creeping of said member when said lock is in locked position.

20. In a car coupler, a head, a lock mounted in said head and adapted to assume a projected locking position and a retracted lock-seat position, a lock thrower for retracting said lock, an anti-creep element for precluding accidental movement of said lock to retracted position, and a member for moving said element out of anti-creep relationship with said lock, and means for preventing undesired movement of said member when said coupler is coupled with another coupler, said means comprising a projection at the forward end of said member in contact with a portion of an opposing coupler and stop means at the rearward end of said member for engagement with said thrower.

21. A lock adapted to reciprocate in a cavity of a rigid-jawed coupler head, said lock comprising socket means adapted to receive bearing means of the coupler head to allow rolling of said lock from locked position to lock-set position, and a pair of vertically spaced lugs on one side of said lock, one of said lugs being adapted for engagement with an anti-creep element in said head for precluding movement of said lock from locked position toward lock-set position, the other of said lugs being adapted for engagement with a lock-set member in said head for maintaining said lock in lock-set position.

22. A lock adapted to reciprocate in a cavity of a rigid-jawed coupler head, said lock comprising upper and lower sockets to allow rolling of said lock about corresponding bearing portions of said coupler head, the lower of said sockets engaging the corresponding one of the bearing portions of said head when said lock is in locked position, the upper of said sockets being adapted upon a predetermined amount of rolling of said lock to engage the other corresponding one of the bearing portions of said head.

23. A lock thrower for actuating the lock of a rigid-jawed coupler head, said thrower being adapted for pivotal mounting in said coupler head, said thrower comprising a cam surface for engaging the lock to move said lock from locked to lock-set position, and another cam surface for actuating a lock-set member in said coupler head during rotation of said thrower.

24. A lock thrower for actuating the lock of a rigid-jawed coupler head, said thrower being adapted for pivotal mounting in said coupler head, said thrower comprising a cam surface for moving a lock-set member in said coupler head into position for maintaining the lock in lock-set position upon rotation of said thrower in a given direction, and another cam surface for engagement with the lock-set member upon rotation of said thrower in the opposite direction to release the member from the position in which the lock is maintained in lock-set position.

25. A lock-set member adapted for maintaining the lock of a rigid jawed coupler head in lock-set position, said member having an elongated slot for operatively mounting said member in said head, said member having a lug adapted for actuating an associated anti-creep element in said head during upward movement of said member.

26. A lock-set member adapted for maintaining the lock of a rigid jawed coupler head in lock-set position, said member having an elongated slot for operatively mounting said member in said head, said member having a stop for engagement with a lug on the lock when the latter is in lock-set position, said member having a cam surface adapted for engagement with a lock thrower pivotally mounted in said head, when the thrower is rotated, to raise said member to a position in which said stop is out of contact with said lug.

27. An anti-creep element for precluding accidental movement to unlocked position of the lock of a rigid jawed coupler head, said member being adapted for pivotal attachment to said coupler head, said element having an arm for engagement with said lock to preclude accidental movement of said lock to unlocked position, said element having a stop lug intermediate the pivotal axis thereof and the end of said arm, said lug being adapted for engagement with a lock-set member in said head for movement of said arm out of anti-creep relationship with said lock when said member is raised.

28. A car coupler having a rigid jawed head, a lock adapted to reciprocate in a cavity of said head to assume a locking position and an unlocking position, a pivotally mounted lock thrower for actuating said lock, said coupler comprising anti-creep mechanism mounted within said head to prevent movement of said lock to an unlocking position, said anti-creep mechanism comprising an element movable into the path of movement of said lock and means movable by said lock thrower for preventing said element from moving out of said lock path.

WILLIAM J. METZGER.

REFERENCES CITED

The following references are of record in the file of this patent:

UNITED STATES PATENTS

| Number | Name | Date |
|---|---|---|
| 1,647,498 | Anliker et al. | Nov. 1, 1927 |
| 1,990,887 | Wittmer et al. | Feb. 12, 1935 |